United States Patent
Tanaka

(10) Patent No.: US 7,576,708 B2
(45) Date of Patent: Aug. 18, 2009

(54) DISPLAY APPARATUS

(75) Inventor: Shinya Tanaka, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 372 days.

(21) Appl. No.: 11/520,670

(22) Filed: Sep. 14, 2006

(65) Prior Publication Data
US 2007/0064102 A1 Mar. 22, 2007

(30) Foreign Application Priority Data
Sep. 21, 2005 (JP) ............... 2005-274788

(51) Int. Cl.
G09G 5/00 (2006.01)
(52) U.S. Cl. .................. 345/7; 359/834
(58) Field of Classification Search ........... 345/7–9, 345/156, 157
See application file for complete search history.

(56) References Cited

U.S. PATENT DOCUMENTS

| | | | |
|---|---|---|---|
| 5,381,684 A | 1/1995 | Kawamura | |
| 5,450,292 A | 9/1995 | Yokoyama et al. | |
| 5,453,855 A | 9/1995 | Nakamura et al. | |
| 5,581,683 A | 12/1996 | Bertignoll et al. | |
| 5,828,415 A | 10/1998 | Keating et al. | |
| 5,936,596 A | 8/1999 | Yoshida et al. | |
| 6,046,849 A | 4/2000 | Moseley et al. | |
| 6,055,013 A | 4/2000 | Woodgate et al. | |
| 6,055,103 A | 4/2000 | Woodgate et al. | |
| 6,104,451 A | 8/2000 | Matsuoka et al. | |
| 6,108,060 A | 8/2000 | Funamoto et al. | |
| 6,377,295 B1 | 4/2002 | Woodgate et al. | |
| 6,437,915 B2 * | 8/2002 | Moseley et al. ............. | 359/465 |
| 6,512,607 B1 | 1/2003 | Windsor et al. | |
| 6,545,655 B1 | 4/2003 | Fujikawa | |
| 6,624,863 B1 | 9/2003 | Jacobs et al. | |
| 6,628,352 B1 | 9/2003 | Sumida et al. | |
| 6,731,416 B2 | 5/2004 | Hazzard | |
| 6,954,185 B2 * | 10/2005 | Ogino ............................ | 345/7 |
| 6,960,001 B2 | 11/2005 | Nitto et al. | |
| 7,030,944 B2 | 4/2006 | Fujimoto | |
| 7,077,526 B2 | 7/2006 | Overmann et al. | |

(Continued)

FOREIGN PATENT DOCUMENTS

EP 0 829 744 A2 3/1998

(Continued)

OTHER PUBLICATIONS

S. Tanaka et al., "Display Apparatus," U.S. Appl. No. 11/520,748, filed Sep. 14, 2006.

(Continued)

*Primary Examiner*—Kevin M Nguyen
(74) *Attorney, Agent, or Firm*—Oliff & Berridge, PLC

(57) ABSTRACT

A display apparatus includes a display panel that displays individual images in a plurality of viewing directions on a common screen, a parallax barrier that makes the individual images respectively visible from the plurality of viewing directions, a light guide plate that guides a light to the display panel, a diffuser arranged between the light guide plate and the display panel, a front surface brightness increasing film arranged between the diffuser and the display panel, and a polarizing plate arranged between the front surface brightness increasing film and the display panel.

5 Claims, 14 Drawing Sheets

U.S. PATENT DOCUMENTS

| | | |
|---|---|---|
| 7,151,532 B2 | 12/2006 | Schulz |
| 7,167,222 B2 | 1/2007 | Inoue et al. |
| 7,250,710 B2 | 7/2007 | Gilmour et al. |
| 7,292,296 B2 | 11/2007 | Kanbe et al. |
| 7,337,450 B2 | 2/2008 | Sato et al. |
| 7,354,163 B2 * | 4/2008 | Suzuki et al. ............... 359/601 |
| 2001/0043302 A1 | 11/2001 | Inoue et al. |
| 2002/0001128 A1 | 1/2002 | Moseley et al. |
| 2003/0085659 A1 | 5/2003 | Overmann et al. |
| 2003/0142249 A1 | 7/2003 | Fujimoto |
| 2004/0119896 A1 | 6/2004 | Kean et al. |
| 2004/0263060 A1 | 12/2004 | Gilmour et al. |
| 2004/0263717 A1 | 12/2004 | Hsu et al. |
| 2005/0052529 A1 | 3/2005 | Mashitani et al. |
| 2005/0111100 A1 | 5/2005 | Mather et al. |
| 2005/0174658 A1 | 8/2005 | Long et al. |
| 2006/0066507 A1 * | 3/2006 | Yanagisawa ................... 345/7 |
| 2006/0191177 A1 * | 8/2006 | Engel ........................... 40/453 |
| 2006/0192746 A1 * | 8/2006 | Ioki et al. ................... 345/102 |

FOREIGN PATENT DOCUMENTS

| | | |
|---|---|---|
| GB | 2 405 545 A | 3/2005 |
| GB | 2 405 546 A | 3/2005 |
| JP | A-05-055623 | 5/1993 |
| JP | A-05-246285 | 9/1993 |
| JP | A-6-186526 | 7/1994 |
| JP | A-6-236152 | 8/1994 |
| JP | A-7-103778 | 4/1995 |
| JP | A-9-46622 | 2/1997 |
| JP | A 10-123461 | 5/1998 |
| JP | A-10-130537 | 5/1998 |
| JP | A-11-52105 | 2/1999 |
| JP | A 11-52372 | 2/1999 |
| JP | A 11-84131 | 3/1999 |
| JP | A-11-088245 | 3/1999 |
| JP | A-11-95167 | 4/1999 |
| JP | A-11-109339 | 4/1999 |
| JP | A-11-248466 | 9/1999 |
| JP | A-11-331876 | 11/1999 |
| JP | A-11-339527 | 12/1999 |
| JP | A-2000-36927 | 2/2000 |
| JP | A-2000-47195 | 2/2000 |
| JP | A-2000-076838 | 3/2000 |
| JP | A-2000-137443 | 5/2000 |
| JP | A-2000-162979 | 6/2000 |
| JP | A 2000-180834 | 6/2000 |
| JP | A-2000-261731 | 9/2000 |
| JP | A-2001-083903 | 3/2001 |
| JP | A 2001-283926 | 10/2001 |
| JP | A-2001-311944 | 11/2001 |
| JP | A-2002-234399 | 8/2002 |
| JP | A-2003-121847 | 4/2003 |
| JP | A-2003-137005 | 5/2003 |
| JP | A-2003-196682 | 7/2003 |
| JP | A-2003-197018 | 7/2003 |
| JP | A-2003-337326 | 11/2003 |
| JP | A-2004-79488 | 3/2004 |
| JP | B2-3503925 | 3/2004 |
| JP | A-2004-233816 | 8/2004 |
| JP | A-2004-348204 | 12/2004 |
| JP | A-2005-71286 | 3/2005 |
| JP | A-2005-73076 | 3/2005 |
| JP | A 2005-78080 | 3/2005 |
| JP | A-2005-86773 | 3/2005 |
| JP | A-2005-255090 | 9/2005 |
| JP | A-2005-284592 | 10/2005 |
| JP | A-2005-313782 | 11/2005 |
| JP | A-2006-64733 | 3/2006 |
| JP | A-2006-076369 | 3/2006 |
| JP | A-2006-131227 | 5/2006 |
| JP | A-2006-151363 | 6/2006 |
| JP | A-2006-151364 | 6/2006 |
| KR | 10-2000-0008458 | 2/2000 |
| KR | 10-2005-0008173 | 1/2005 |
| WO | WO 97/42540 | 11/1997 |
| WO | WO 2004/011987 A1 | 2/2004 |
| WO | WO 2004/016460 A1 | 2/2004 |

OTHER PUBLICATIONS

S. Tanaka et al., "Display Apparatus and In-Vehicle Display Apparatus," U.S. Appl. No. 11/712,517, filed Mar. 1, 2007.

S. Tanaka et al., "Display Apparatus," U.S. Appl. No. 11/520,743, filed Sep. 14, 2006.

S. Tanaka et al., "In-Vehicle Display Apparatus and Display Control Method Therefor," U.S. Appl. No. 11/583,076, filed Oct. 19, 2006.

S. Tanaka, "Liquid Crystal Display Apparatus," U.S. Appl. No. 11/488,064, filed Jul. 18, 2006.

S. Tanaka, "Display Device and Display Method," U.S. Appl. No. 11/299,657, filed Dec. 13, 2005.

M. Maehata et al., "Receiver," U.S. Appl. No. 11/475,216, filed Jun. 27, 2006.

"Fujitsu Ten Technical Report", vol. 23, No. 2, Dec. 2005, pp. 22-27.

"Fujitsu Ten Technical Journal," No. 26, Jan. 2006, pp. 17-22.

* cited by examiner

GROUP OF FIRST IMAGES (IMAGE IS DISPLAYED ON THE LEFT SIDE)  GROUP OF SECOND IMAGES (IMAGE IS DISPLAYED ON THE RIGHT SIDE)

DISPLAY APPARATUS

BACKGROUND OF THE INVENTION

1. Field of the Invention

This invention generally relates to display apparatuses, and more particularly, to a display apparatus having so-called multi-view functionality, with which different images are respectively visible from different viewing directions on a common display screen.

2. Description of the Related Art

In recent years, in-vehicle liquid crystal display apparatuses have been rapidly widespread so as to watch car navigation maps or video images in vehicles. As a so-called multi-view display having a common display screen, on which different images are respectively visible from different viewing directions (view angles), there has been known a multi-view display with a liquid crystal panel having a parallax barrier on the front side thereof. Different information (images) can be displayed on the right and left sides of the display screen by separating directions of lights through a backlight on a pixel basis (for example, as disclosed in Japanese Patent Application Publication No. 2005-78080). Such display is mounted on a vehicle, allowing the front-seat passenger to watch a TV program or another image, while the driver is checking a navigation map image.

When such multi-view display is used as the in-vehicle liquid crystal display apparatus, the lights of the backlight are sorted into left and right images. For this reason, in order to maintain the brightness of the left and right images, the brightness of the liquid crystal display screen needs to be increased when the different images are viewed from different viewing directions.

SUMMARY OF THE INVENTION

The present invention has been made in view of the above circumstances and provides a display apparatus in which the brightness of a display screen can be increased when different images are viewed from different viewing directions.

According to one aspect of the present invention, there is provided a display apparatus including: a display panel that displays individual images in a plurality of viewing directions on a common screen; a parallax barrier that makes the individual images respectively visible from the plurality of viewing directions; a light guide plate that guides a light to the display panel; a diffuser arranged between the light guide plate and the display panel; a front surface brightness increasing film arranged between the diffuser and the display panel; and a polarizing plate arranged between the front surface brightness increasing film and the display panel. The light is diffused on the diffuser, such diffused light is collected on the front surface brightness increasing film, such collected light is polarized on the polarizing plate, and such polarized light of the front surface direction is reflected or absorbed. Accordingly, the brightness can be increased when the different images are viewed from different viewing directions on the display apparatus. The above-described display apparatus may further include a display controller that outputs the individual images on the display panel.

BRIEF DESCRIPTION OF THE DRAWINGS

Preferred exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

First Exemplary Embodiment

Figure 1:
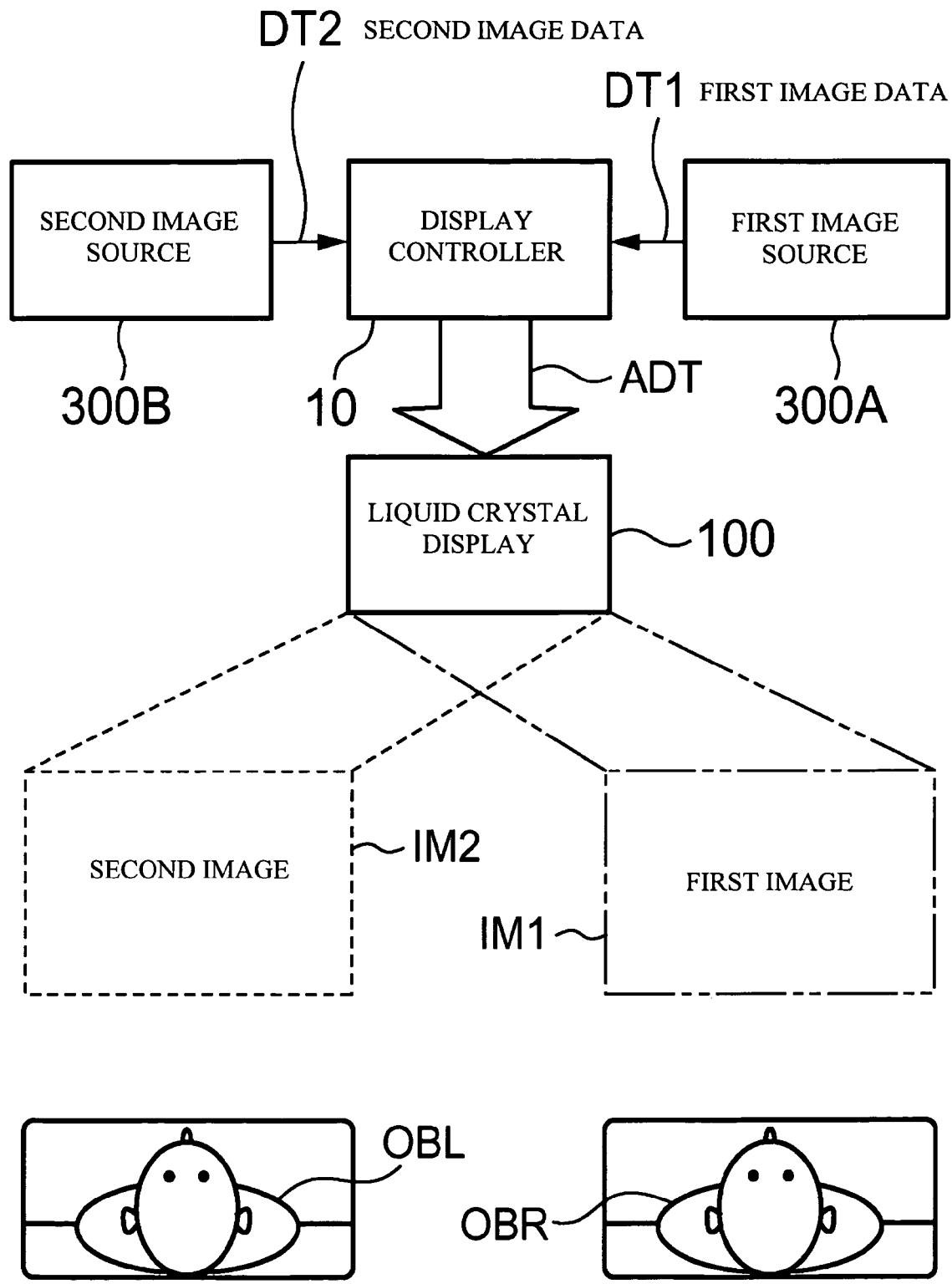
FIG. 1 is a view illustrating a basic configuration of a multi-view display apparatus in accordance with a first embodiment of the present invention.

FIG. 1 is a view illustrating a basic configuration of a multi-view display apparatus in accordance with a first exemplary embodiment of the present invention. In the first exemplary embodiment, a description will be given of an example in which the display apparatus is mounted in a vehicle. Referring now to FIG. 1, the multi-view display apparatus includes a display controller 10 that serves as a display control portion and a display 100 that serves as a display portion. To the display controller 10, image data DT1 is supplied from a first image source 300A that serves as a supply source, and at the same time, image data DT2 is also supplied from a second image source 300B that serves as a supply source. Then, image data ADT, which is composed of the first image data DT1 and the second image data DT2, is output to the common display 100. The configuration of the display controller 10 will be described later in detail. The first image source 300A and the second image source 300B are respectively composed of a camera, TV receiver, DVD reproducing portion, HD reproducing portion, navigation portion, and the like, as will be described later.

The display 100 includes a liquid crystal panel, backlight, parallax barrier, and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second image IM2 from a left-hand direction. The configuration of the display 100 will also be described later in detail.

Figure 2:
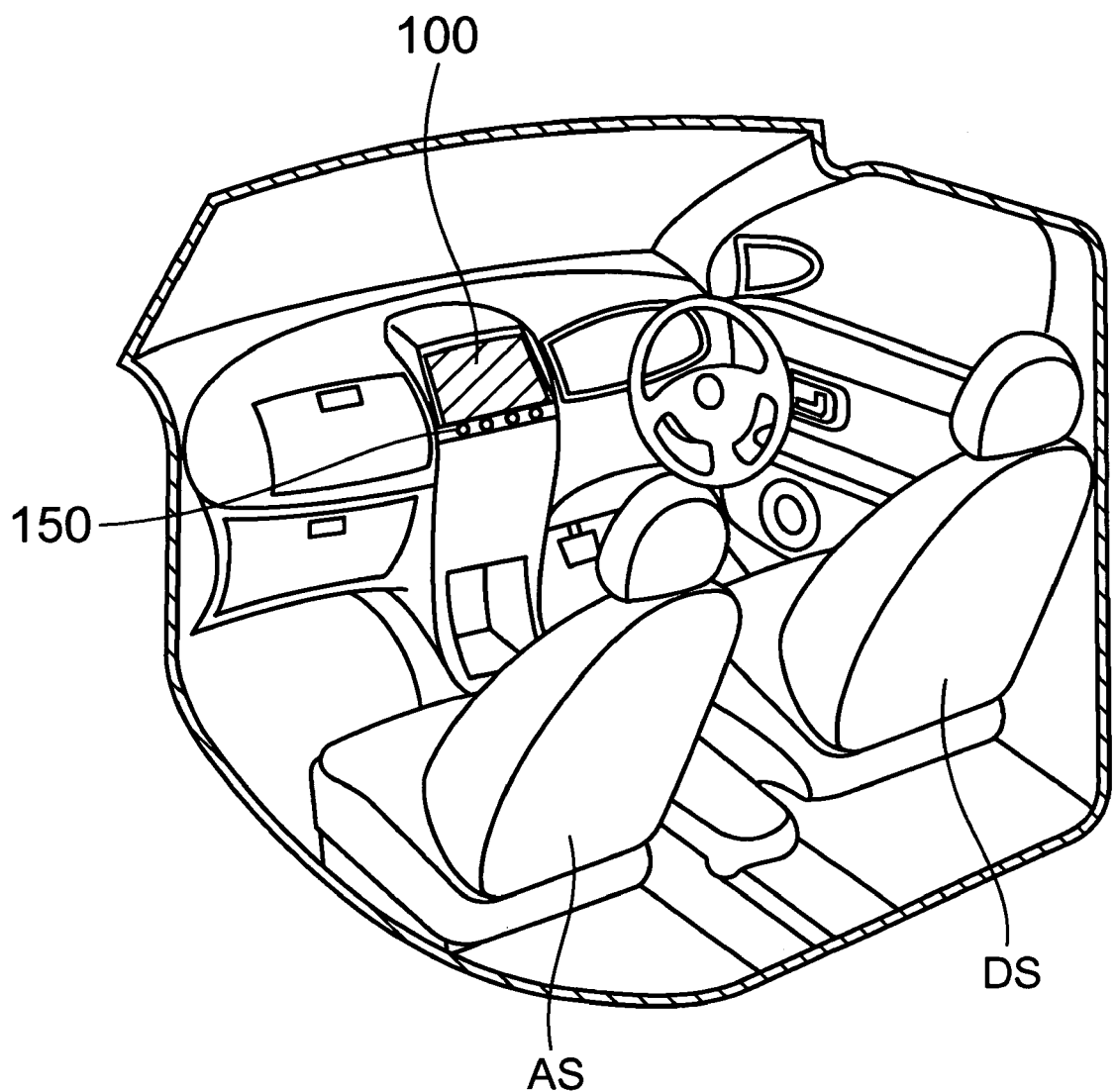
FIG. 2 is a perspective view showing an example in which the display apparatus is applied to a vehicle in accordance with the first embodiment of the present invention.

FIG. 2 is a perspective view showing an example in which the display apparatus employed in the first exemplary embodiment of the present invention is applied to a vehicle. Referring to FIG. 2, the display 100 is arranged between a driver's seat DS and a front passenger's seat AS in a dashboard area of the vehicle. In addition, the display 100 is provided with an operating portion 150 so as to manually operate the display apparatus. According to an exemplary embodiment shown in FIG. 2, a passenger who sits on the driver's seat DS corresponds to the above-described observer OBR, and another passenger who sits on the front passenger's seat AS corresponds to the above-described observer OBL. Those passengers are able to simultaneously watch the first image IM1 and the second image IM2, which are respectively different, being displayed on the display 100 from the driver's seat DS and from the front passenger's seat As.

Figure 3:
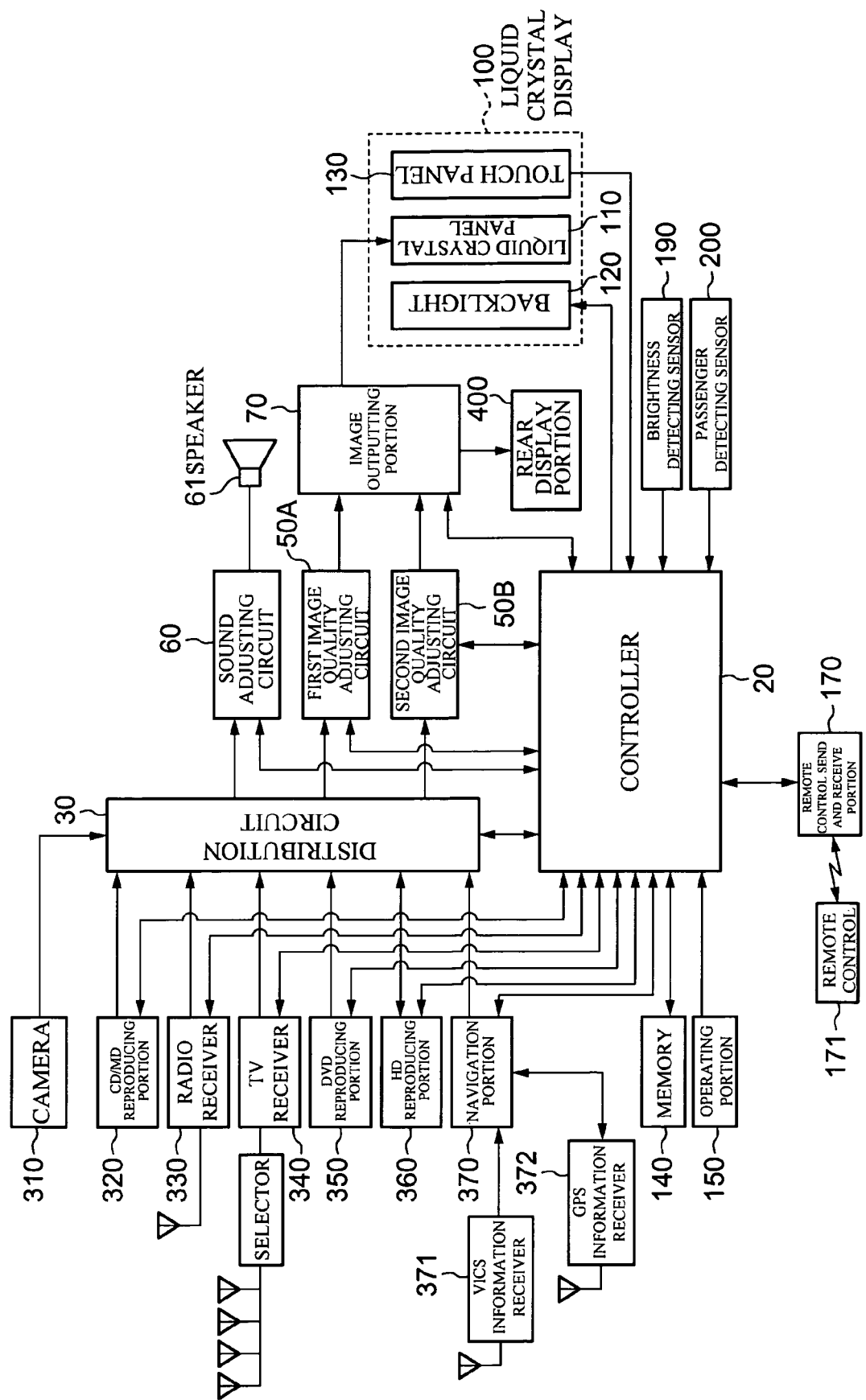
FIG. 3 is a functional block diagram of the display apparatus in accordance with the first embodiment of the present invention.
Figure 4:
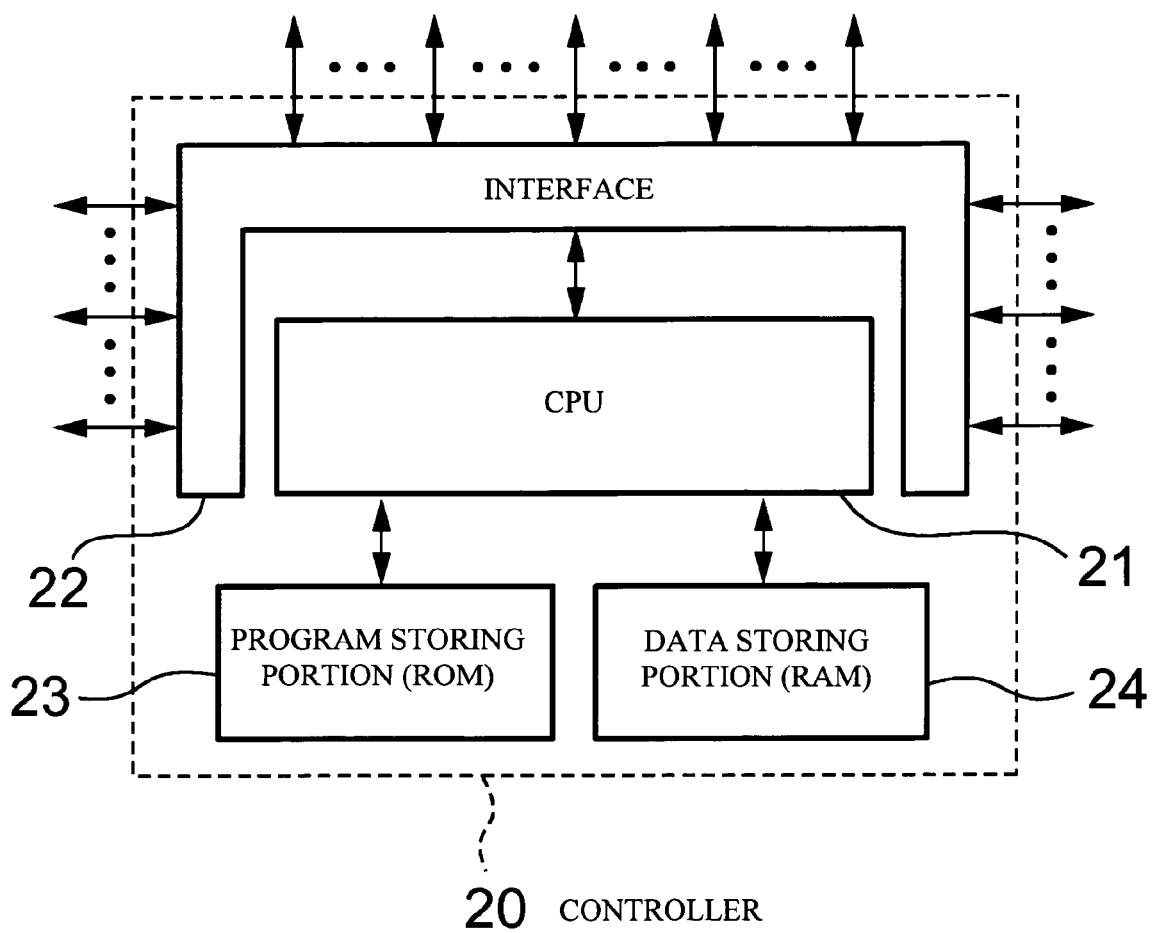
FIG. 4 is a functional block diagram showing a configuration of a controller in accordance with the first embodiment of the present invention.
Figure 5:
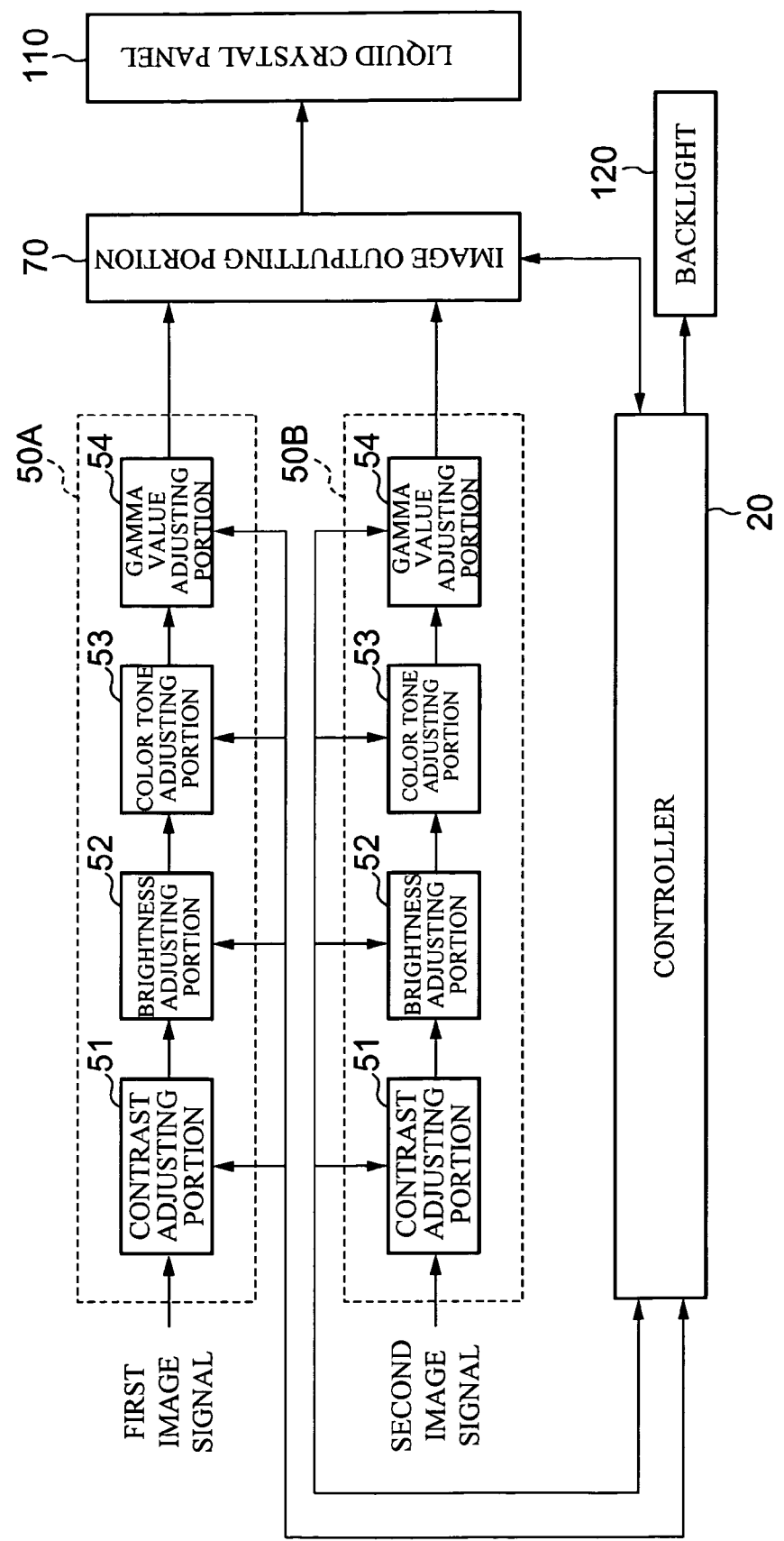
FIG. 5 is a functional block diagram of first and second image quality adjusting circuits in accordance with the first embodiment of the present invention.
Figure 6:
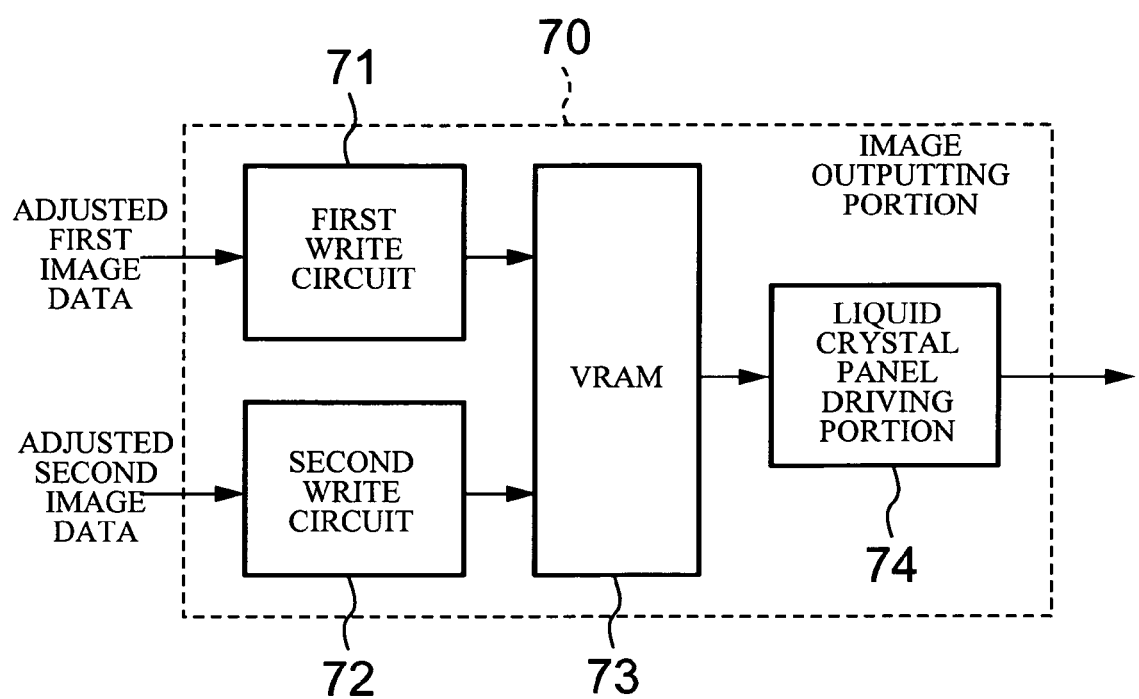
FIG. 6 is a functional block diagram of an image outputting portion in accordance with the first embodiment of the present invention.
Figure 7:
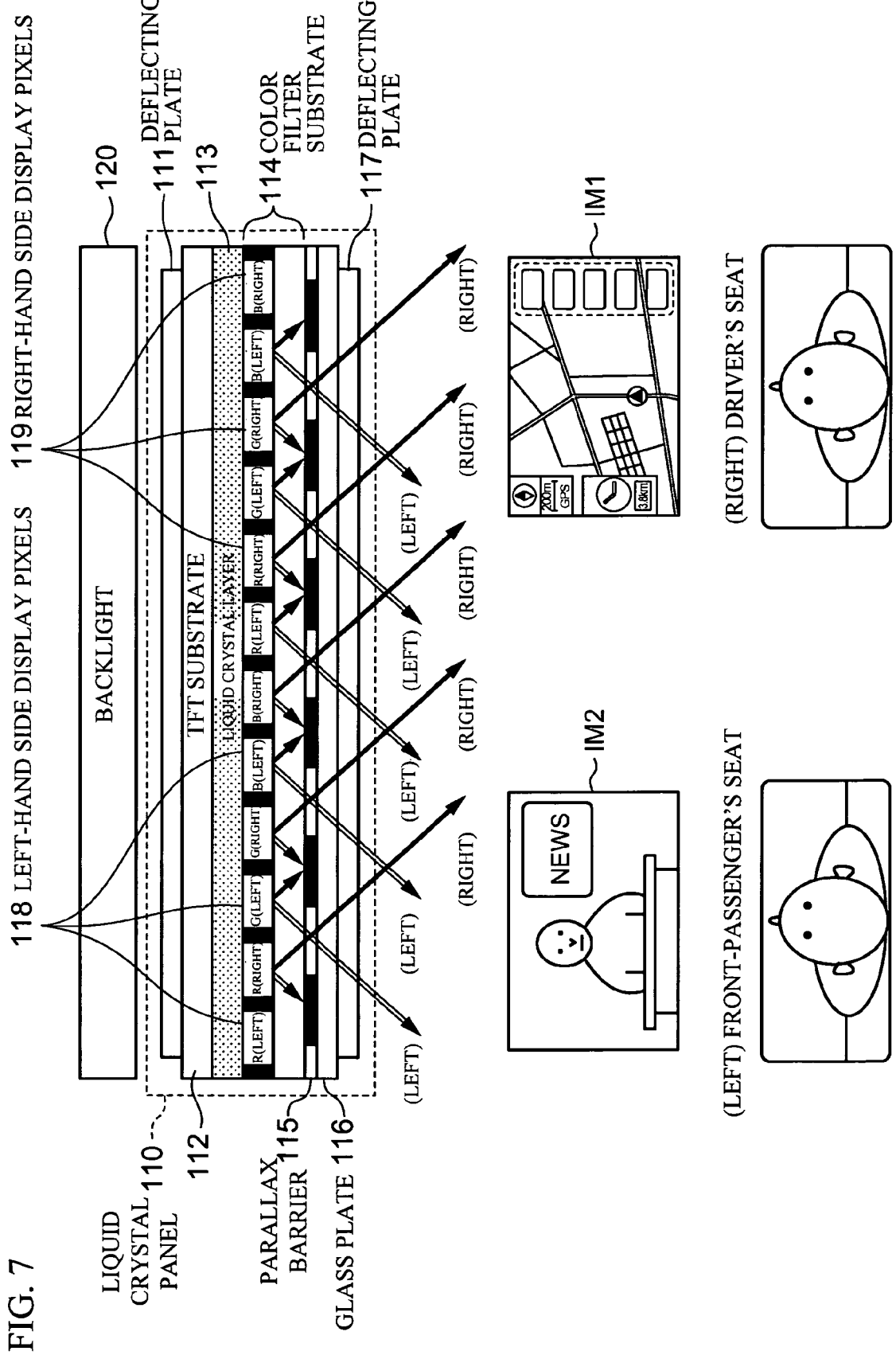
FIG. 7 is a view illustrating a cross-sectional configuration and effects of a liquid crystal panel in accordance with the first embodiment of the present invention.
Figure 8:
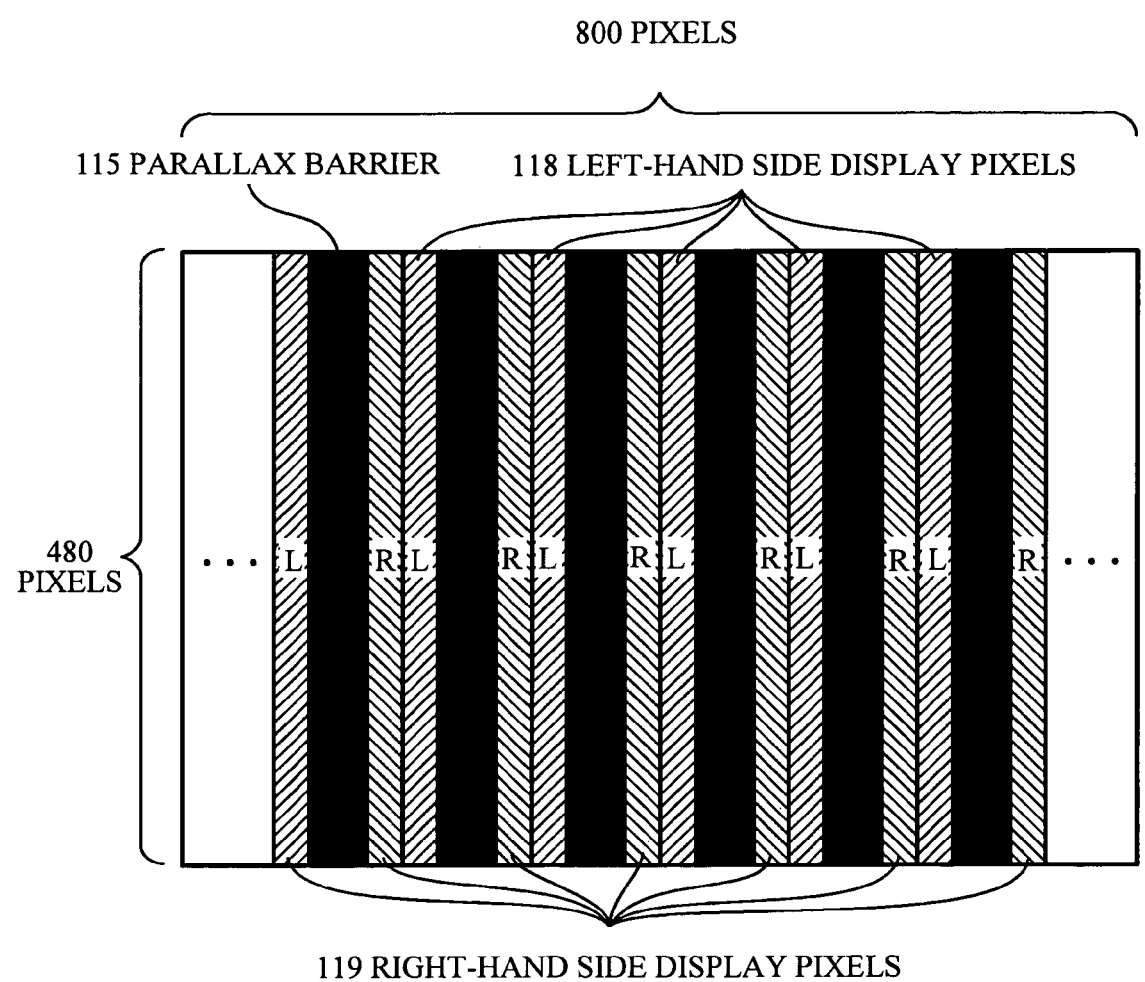
FIG. 8 is a front view of the liquid crystal panel in accordance with the first embodiment of the present invention.
Figure 9:
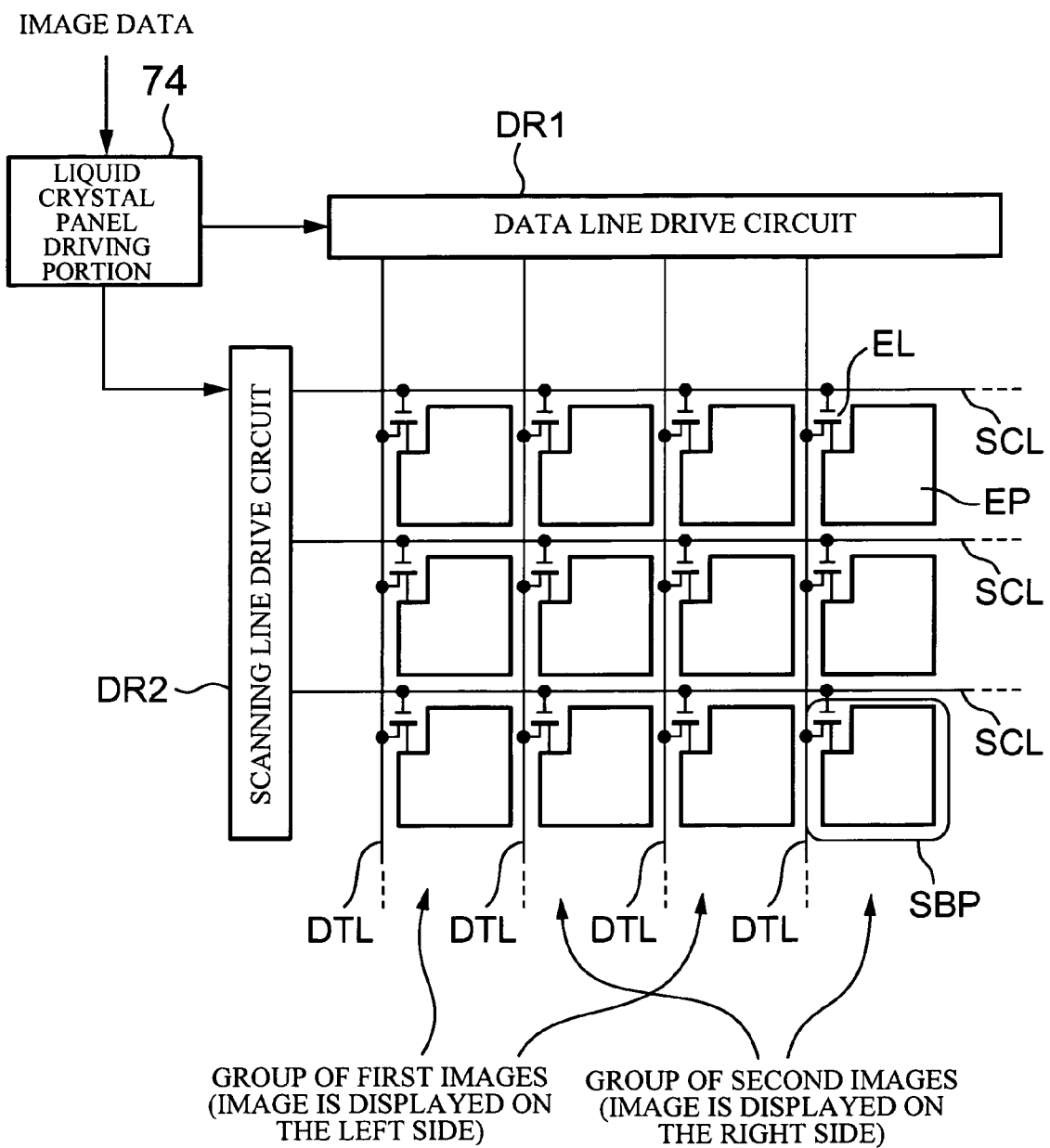
FIG. 9 is a circuit diagram of a TFT substrate in accordance with the first embodiment of the present invention.

FIG. 3 through FIG. 9 illustrate specific configurations of the display apparatus in accordance with the first exemplary embodiment of the present invention. FIG. 3 is a functional block diagram of the display apparatus. FIG. 4 is a functional block diagram showing a configuration of the controller. FIG. 5 is a functional block diagram of first and second image quality adjusting circuits. FIG. 6 is a functional block diagram of an image outputting portion. FIG. 7 is a view illustrating a cross-sectional configuration and effects of a liquid crystal panel. FIG. 8 is a front view of the liquid crystal panel. FIG. 9 is a circuit diagram of a TFT substrate.

Referring now to FIG. 3, the display apparatus includes the display 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 4, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM2, which are separated from each other by superimposing the first image IM1 and the second image IM2 to be displayed on the display 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a digital versatile disc (DVD) reproducing portion 350, a hard disc (HD) reproducing portion 360, a navigation portion 370, and the like, so as to send and receive data and control the afore-described components, which are mounted on a vehicle and respectively serve as supply sources supplying images and sounds, as illustrated in FIG. 3. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images in a DVD. The HD reproducing portion 360 reproduces images and music information stored in a HD. The navigation portion 370 outputs maps or route guide images on the basis of road information received by a VICS information receiver 371 and geographic information received by a GPS information receiver 372.

Additionally, the controller 20 is also connected to an external memory 140, the operating portion 150, a remote control send and receive portion 170, a brightness detecting sensor 190, a passenger detecting sensor 200, and the like, and enables various controls on the basis of various kinds of data obtained from the aforementioned components. The external memory 140 stores various kinds of data. The operating portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 3, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 3.

Each of the first image quality adjusting circuit 50A and the second image quality adjusting circuit 50B, by reference to FIG. 5, includes a contrast adjusting portion 51, a brightness adjusting portion 52, a color tone adjusting portion 53, a gamma value adjusting portion 54, and the like, and respectively adjusts the image qualities (contrast, brightness, color tone, and gamma value) of the image qualities of the first image data and the second image data, in response to the control instruction issued by the controller 20.

Referring now to FIG. 6, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data into given addresses of the VRAM 73, in order to superimpose such adjusted first image data and such adjusted second image data.

The VRAM 73 retains the image data on which the first image data and the second image data are superimposed. Such superimposed image data corresponds to respective pixels of the display 100. The liquid crystal panel driving portion 74 is a circuit that drives a liquid crystal panel 110, and also drives the corresponding pixels of the liquid crystal panel 110, on the basis of the superimposed image data retained in the VRAM 73. The liquid crystal panel 110 will be described later in detail.

The display 100 includes the liquid crystal panel 110, a backlight 120, a touch panel 130, and the like, as illustrated in FIG. 3. The backlight 120 sheds illuminated lights from the backside of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 7, the liquid crystal panel 110 has a known structure. Sequentially from the backlight 120, there are provided a first deflecting plate 111, a thin film transistor (TFT) substrate 112, a liquid crystal layer 113, a color filter substrate 114 having pixels for three primary colors of RGB, a parallax barrier 115, a glass plate 116, a second deflecting plate 117, and the like.

The above-described liquid crystal panel 110 has a display screen in which, for example, 800 pixels are arranged in a horizontal direction and 480 pixels in a vertical direction, as illustrated in FIG. 7 and FIG. 8. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 7 and FIG. 8. The shielding portions are arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This makes the first image IM1 visible from the right side (the driver's seat) of the liquid crystal panel 110, and also makes the second image IM2 visible from the left side (the front passenger's side). Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 9, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119. A drive timing of the data line drive circuit DR1 is controlled by the liquid crystal panel driving portion 74 to control a voltage applied to the pixel electrode EP. A Drive timing of the scanning line drive circuit DR2 is controlled by the liquid crystal panel driving portion 74 to selectively scan the TFT element EL.

Figure 10:
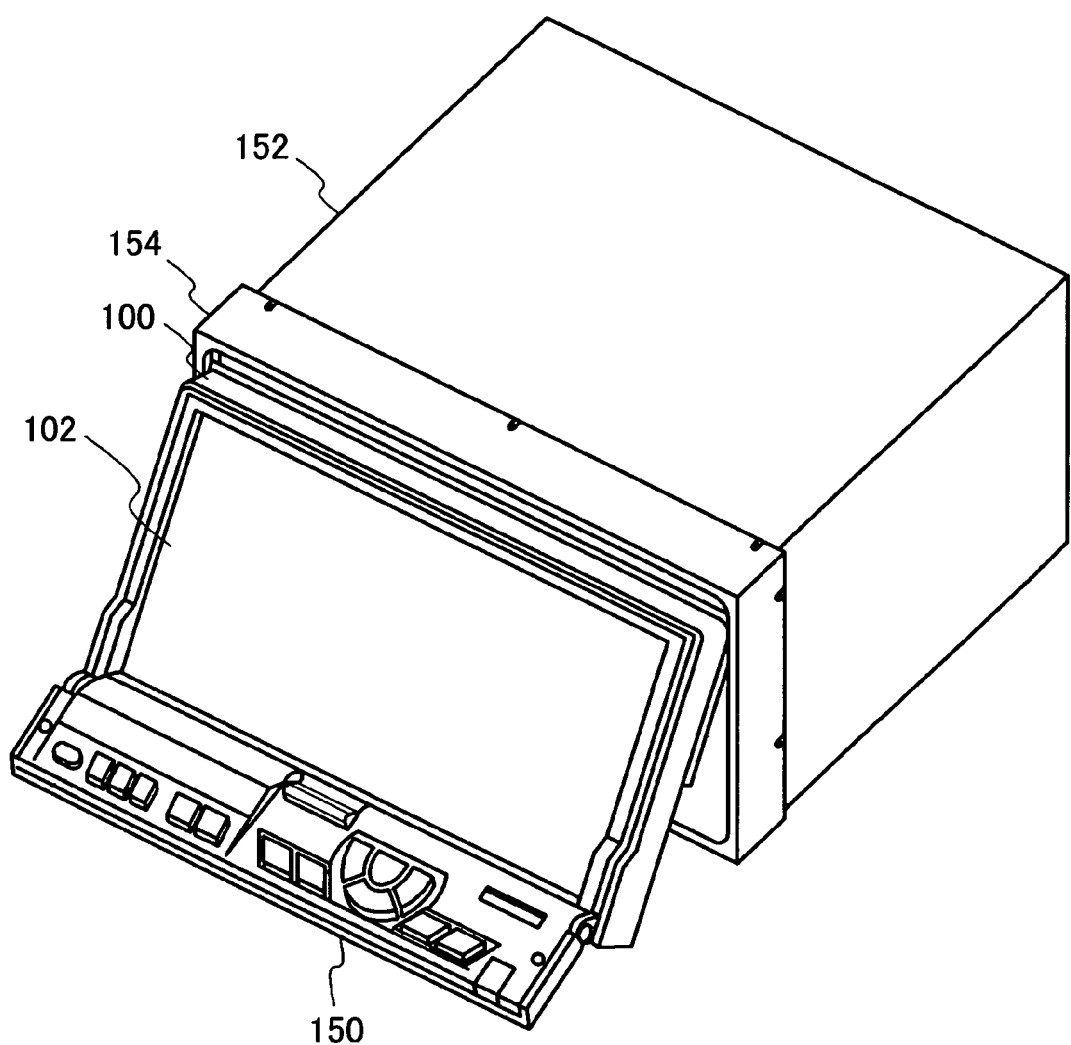
FIG. 10 is an external view of the display apparatus in accordance with the first embodiment of the present invention in a state where the display stands up with respect to a main body.

FIG. 10 is an external view of the display apparatus in accordance with the first exemplary embodiment of the present invention. The display apparatus is composed of: the display 100 having a display screen 102 and the operating portion 150; and a main body 152 composed of a different chassis from the display 100. The display 100 is used in such a manner that the display 100 is accommodated in a frame 154 provided in the periphery of the front surface of the main body 152. The display 100 can be opened by tilting the display 100, as illustrated in FIG. 10, and the storage media such as a DVD and the like can be operated from the front side of the main body 152.

Figure 11A:
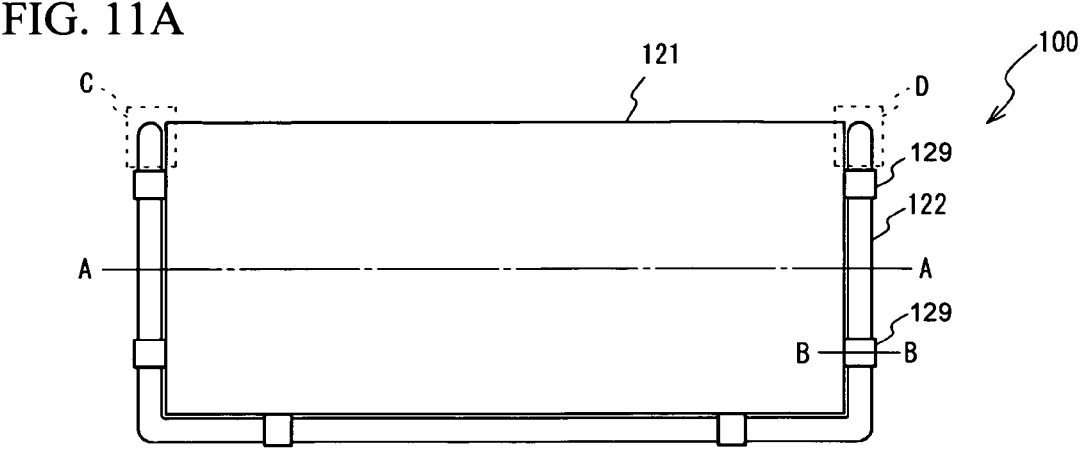
FIG. 11A is a front view of the display.
Figure 11B:
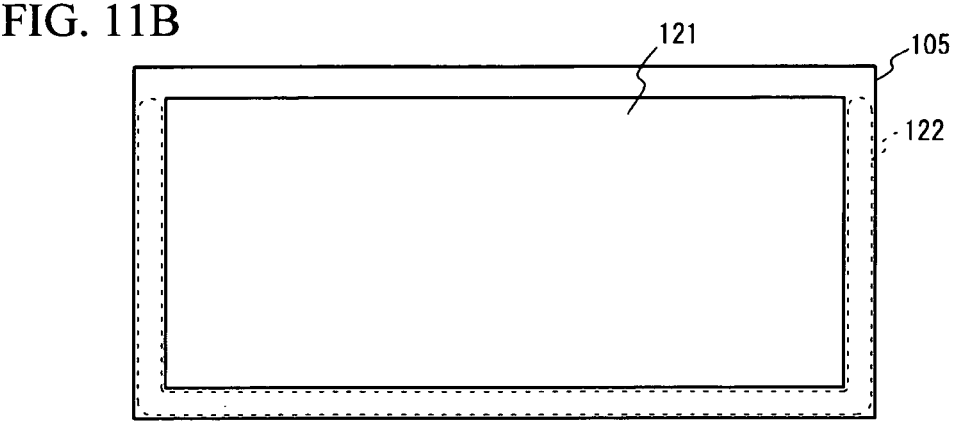
FIG. 11B is a front view of the display shown in FIG. 11A with a chassis.
Figure 11C:
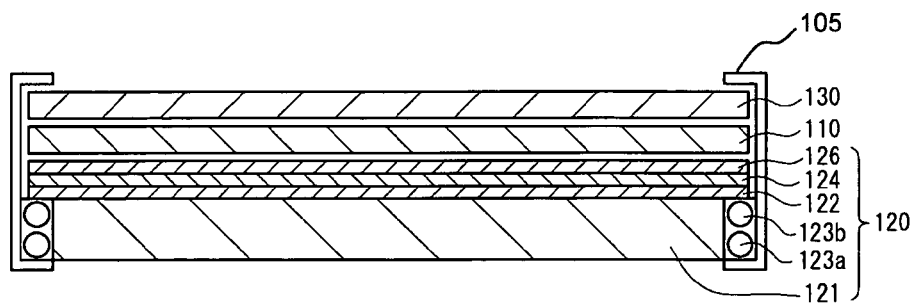
FIG. 11C is a cross-sectional view taken along the line A-A shown in FIG. 11A.
Figure 11D:
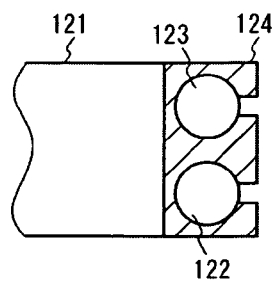
FIG. 11D is a cross-sectional view taken along the line B-B shown in FIG. 11A.

FIG. 11A through FIG. 11D illustrate the display 100 in more details. FIG. 11A is a front view of the display 100 (the chassis 105, the touch panel 130, and the liquid crystal panel 110 are not shown). Fluorescent tubes 123$a$ and 123$b$ are provided at a side of a light guide plate 121 as light-emitting portions. The fluorescent tubes 123$a$ and 123$b$ are secured by securing members 129. FIG. 11B is a front view of the display 100 shown in FIG. 11A with the chassis 105, and the fluorescent tube 123$a$ is indicated by a dotted line. As shown in FIG. 11B, the width viewed from the front surface of the chassis 105 substantially varies depending on each width of the fluorescent tube 123$a$ and 123$b$. FIG. 11C is a cross-sectional view taken along the line A-A shown in FIG. 11A. The liquid crystal panel 110 is provided on the backside of the touch panel 130, and the light guide plate 121 is provided on the backside of the liquid crystal panel. The two fluorescent tubes 123$a$ and 123$b$ are arranged at the side of the light guide plate 121. The fluorescent tubes 123$a$ and 123$b$ are located in alignment in backward and frontward directions of the light guide plate 121. The backlight 120 is composed of the light guide plate 121 and the fluorescent tubes 123$a$ and 123$b$. The chassis 105 covers the sides of the touch panel 130, the liquid crystal panel 110, the light guide plate 121, and the fluorescent tubes 123$a$ and 123$b$. FIG. 11D is a cross-sectional view taken along the line B-B shown in FIG. 11A. The fluorescent tubes 123$a$ and 123$b$ are secured by the comb-like securing members 129 made of transparent silicon resin.

Figure 12A:
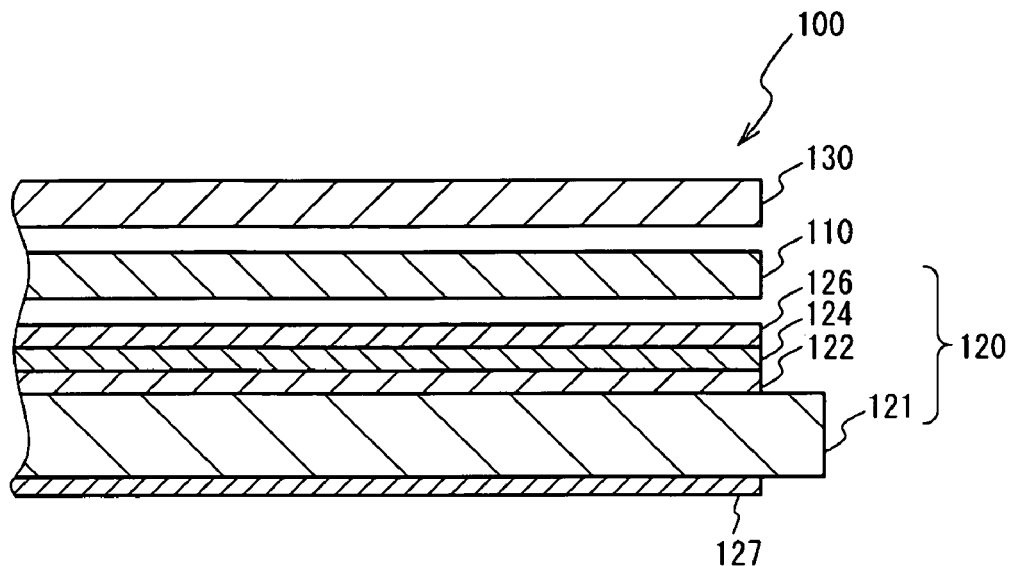
FIG. 12A is a cross-sectional view of the display in accordance with the first exemplary embodiment.

FIG. 12A is a cross-sectional view of the display 100 in accordance with the first exemplary embodiment. On the front side of the backlight 120 (the front side is the side to which the light is emitted), the liquid crystal panel 110 and the touch panel 130 are sequentially provided. The backlight 120 includes: a diffuser 122 arranged between the light guide plate 121 and the liquid crystal panel 110; a front surface brightness increasing film 124 arranged on the liquid crystal panel 110 side of the diffuser 122; and a polarizing plate 126 arranged on the liquid crystal panel 110 side of the front surface brightness increasing film 124. In addition, a light reflector 127 is arranged on the backside of the light guide plate 121, namely, on the opposite side of the liquid crystal panel 110. The light emitted from a fluorescent tube or a light-emitting portion of white LED or the like, not shown, enters the side surface of the light guide plate 121.

Figure 12B:
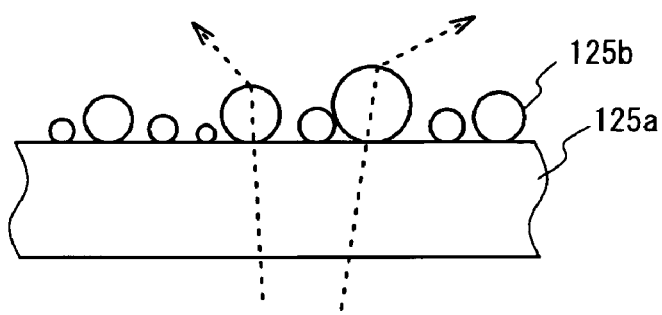
FIG. 12B and FIG. 12C illustrate the configurations of a diffuser.

FIG. 12B illustrates the configuration and functionality of the diffuser 122. The diffuser 122 has a structure in which there are provided transparent spherical particles 125$b$ of different diameters ranging from, for example, several μm to 10 μm, on a transparent plate 125a having a film thickness of, for example, 160 μm made of polyethylene terephthalate (PET) or the like. With such a structure, the light that has entered from the backside of the diffuser 122, that is, from the side of the light guide plate 121, is diffused (scattered) in an arbitrary direction, as shown in FIG. 12B, and is also diffused in an arbitrary polarization direction. As described, the diffuser 122 has a function of diffusing the lights that have entered from one direction to various directions and to various polarization directions.

Figure 12C:
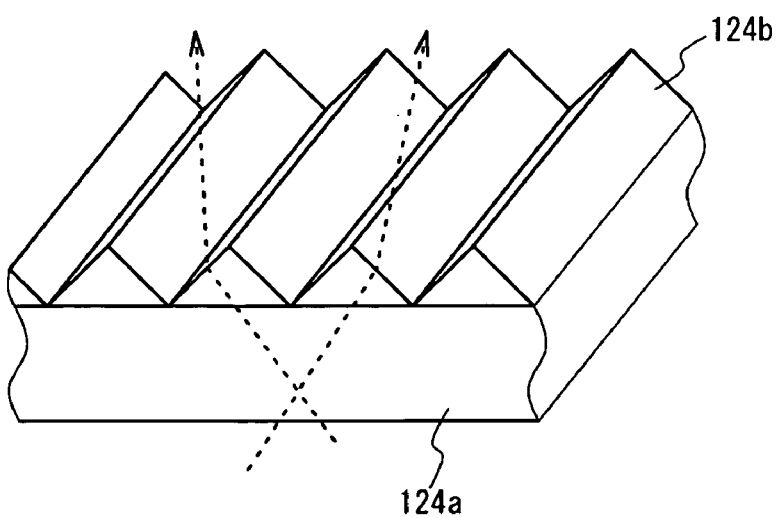

FIG. 12C illustrates the configuration and functionality of the front surface brightness increasing film 124. The front surface brightness increasing film 124 has a structure in which there are provided transparent prism slits 124b made of, for example, acrylic resin or the like, on the surface of a transparent plate 124a having a film thickness of approximately 125 μm made of, for example, polyester or the like. Each of the prism slits 124b has a triangular cross-section, and multiple prism slits 124b are provided in one direction of the transparent plate 124a, more specifically, are successively provided in a width direction of the prism slit 124b. As an example shown in FIG. 12C, the slit width is approximately 50 μm, and the angle of the top of the prism slit is approximately 90 degrees. Also, the prism slits 124b run in a longitudinal direction of the display screen 102, namely, the liquid crystal panel 110. With such a structure, the light enters from various directions on a plane perpendicular to the running direction of the prism slits 124b on the backside of the front surface brightness increasing film 124, namely, on the side of the diffuser 122, and is refracted in the front surface direction of the front surface brightness increasing film 124. In this manner, the front surface brightness increasing film 124 has a function of enhancing the brightness, as the display screen 102 is viewed from the front surface direction, by refracting the lights of various directions in the front surface direction. However, the lights that have entered from various directions on a plane parallel to the running direction of the prism slits 124b are less functional in increasing the brightness of the front surface direction.

The polarizing plate 126 has functions of passing the polarized light in one direction of the plane of the polarizing plate 126 and reflecting the light of another direction. The polarizing plate 126 has a film thickness of approximately 440 μm, and the direction of polarization is a polarized direction of the liquid crystal panel 110, that is to say, the polarized directions of the first deflecting plate 111 and the second deflecting plate 117. The afore-mentioned polarization direction is the longitudinal direction of the display screen 102. The light reflector 127 is a plate having a function of reflecting the light.

A description will now be given of the principle of operation of the above-described configuration. Firstly, a description is given of a case where the diffuser 122 and the polarizing plate 126 are arranged. The light is emitted toward the front surface from the light guide plate 121, and is diffused in various directions and in various polarization directions. Then, the light of the polarization direction identical to that of the liquid crystal panel 110 is emitted toward the liquid crystal panel 110 from the polarizing plate 126. The light of the polarization direction different from that of the liquid crystal panel 110 is reflected by the polarizing plate 126, and is also reflected by the light reflector 127 arranged on the backside of the light guide plate 121. Subsequently, the light is diffused by the diffuser 122 in a similar manner, and the light of the polarization direction identical to that of the liquid crystal panel 110 is selected on the polarizing plate 126 and emitted toward the liquid crystal panel 110. In this manner, it is possible to increase the brightness of the light of the polarization direction identical to that of the liquid crystal panel 110. This can increase the brightness of the liquid crystal display screen, although there are various light directions emitted.

Figure 13:
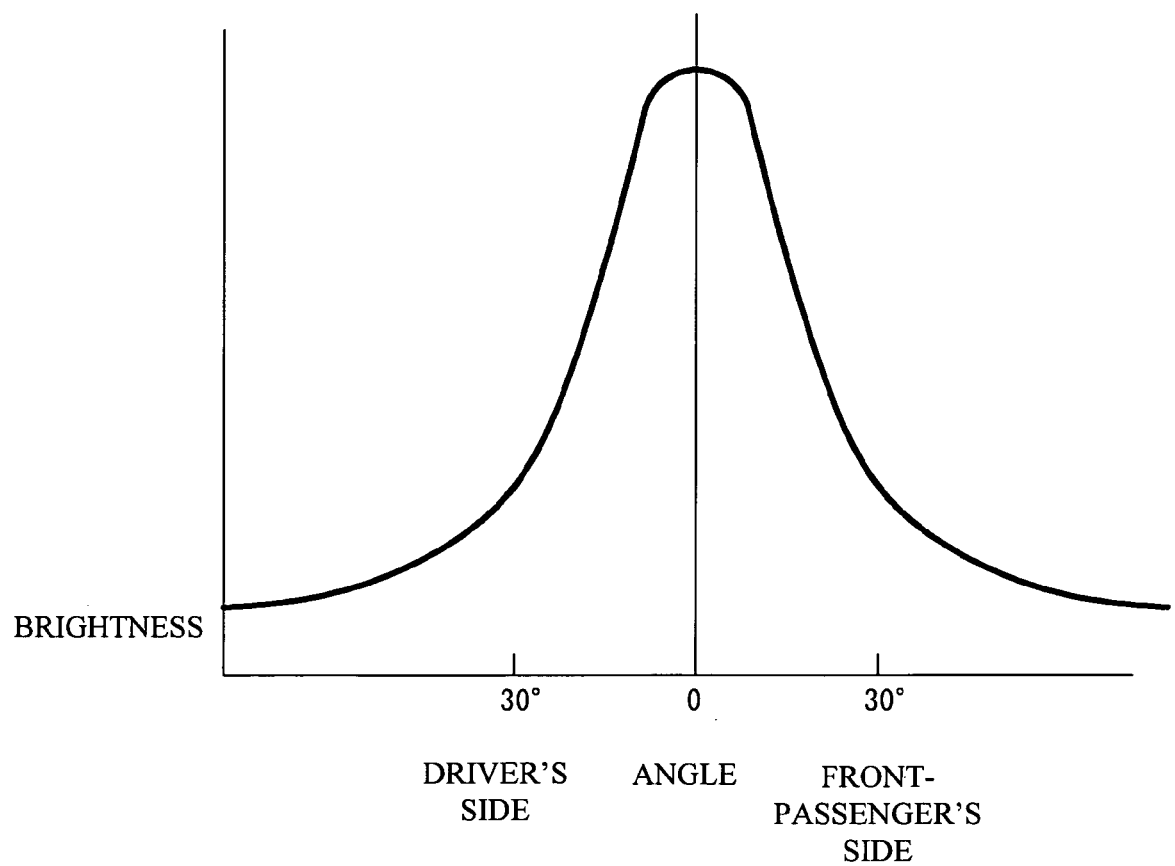
FIG. 13 is a view showing the brightness of lights emitted in respective directions.

Next, a description will now be given of a case where the front surface brightness increasing film 124 is arranged between the diffuser 122 and the polarizing plate 126. By the front surface brightness increasing film 124, the lights diffused in various directions by the diffuser 122 direct toward the front surface. FIG. 13 is a view showing the brightness of lights emitted in respective directions, after the lights pass through the light guide plate 121, the diffuser 122, the front surface brightness increasing film 124, and the polarizing plate 126. The horizontal axis represents the lateral direction of the display screen 102. The left side represents the driver's seat, the right side represents the front-passenger's seat, and 0 represents the front surface direction, namely, the direction perpendicular to the display screen 102. Since the prism slits 124b of the front surface brightness increasing film 124 run in a longitudinal direction of the display screen 102, namely, the liquid crystal panel 110, the brightness is considerably high in the front surface direction in FIG. 13 representing the angles of the lateral direction of the display screen 102. As the angle increases, the brightness drastically decreases.

In the above-described angle distribution, for example, the brightness is lower when viewed from the driver's seat and the front-passenger's seat. This is not desirable as an in-vehicle liquid crystal display apparatus. However, as will be described later in detail, the brightness can be enhanced, for example, when viewed from the driver's seat and the front-passenger's seat by employing the above-described configuration for the in-vehicle liquid crystal display apparatus having a multi-view function, so that the first image and the second image are respectively visible from different angles on a common display screen.

Figure 14:
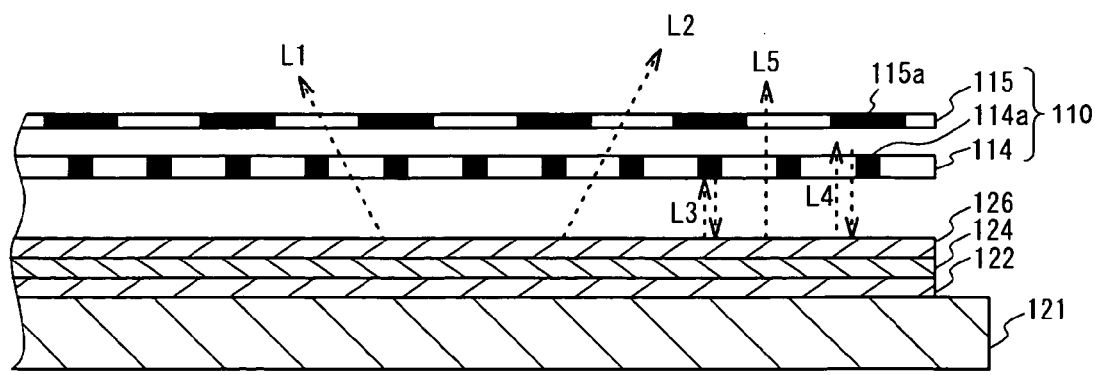
FIG. 14 illustrates the effect of increasing the brightness of the display.

FIG. 14 illustrates the light guide plate 121, the diffuser 122, the front surface brightness increasing film 124, and the polarizing plate 126, and the color filter substrate 114 and the parallax barrier 115 in the liquid crystal panel 110. Other members of the liquid crystal panel 110 are not shown. Lights L3 and L4 respectively entering a region between pixels 114a of the color filter substrate 114 and a shielding portion 115a of the parallax barrier 115 are reflected. A light L5 passing through the color filter substrate 114 (the region between pixels 114a) and the parallax barrier 115 (the region between the shielding portions 115a) is emitted from the liquid crystal panel 110. Most lights emitted in the front surface direction from the polarizing plate 126 are reflected on the liquid crystal panel 110. Meanwhile, the lights emitted in different directions from the front surface direction of the liquid crystal panel 110 from the polarizing plate 126, that is to say, the lights emitted in directions of 30 degrees from the front surface direction, which are visible from the driver's seat and the front-passenger's seat, pass through the region between pixels 114a and the region between the shielding portions 115a, and are emitted from the liquid crystal panel 110. In this manner, even if there is provided the front surface brightness increasing film 124, it is possible to enhance the brightness of the lights emitted in the directions of 30 degrees from the front surface direction.

Figure 15:
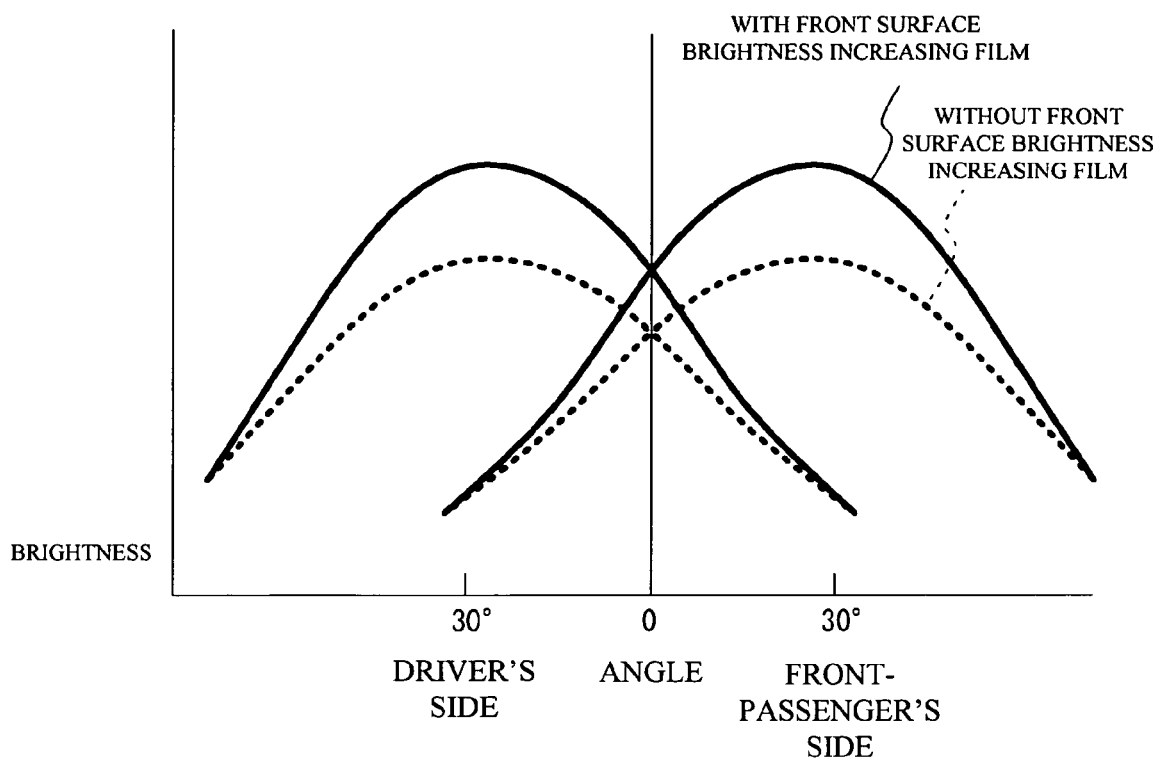
FIG. 15 is a view showing direction dependency of the brightness of the lights emitted according to whether or not there is provided a front surface brightness increasing film.

FIG. 15 is a view showing the brightness of lights emitted from the display screen 102 in respective directions. The horizontal axis and the vertical axis are same as those in FIG. 13, and a detailed explanation will be omitted. Solid lines represent a case where the front surface brightness increasing film 124 is provided and dotted lines represent a case where the front surface brightness increasing film 124 is not provided. The curves on a left-hand side and those on a right-hand side respectively represent the brightness of the image viewed from the driver's seat and that viewed from the front-passenger's seat. The brightness can be enhanced in the directions of 30 degrees from the front surface direction, which are visible directions from the driver's seat and the front-passenger's seat, by providing the front surface brightness increasing film 124. In addition, preferably, the front surface brightness increasing film 124 is provided on the side of the liquid crystal panel 110 of the diffuser 122, so as to make the light diffused by the diffuser 122 enter. Furthermore, when the light passes through the front surface brightness increasing film 124, the direction of polarization changes more or less. Accordingly, it is preferable that the polarizing plate 126 is provided on the side of the liquid crystal panel 110 of the front surface brightness increasing film 124.

As described heretofore, in accordance with the first exemplary embodiment of the present invention, by providing the diffuser 122, the front surface brightness increasing film 124, and the polarizing plate 126 between the light guide plate 121 and the liquid crystal panel 110, it is possible to enhance the brightness of the viewing directions of the display screen 102, namely, the liquid crystal panel 110, when, for example, the first image is viewed from the driver's seat and the second image is viewed from the front-passenger's seat.

Generally, it is possible to enhance the brightness of the front surface direction of the display screen of the liquid crystal display apparatus, by employing the front surface brightness increasing film 124. However, in the display screen used in the in-vehicle liquid crystal display apparatus, the display screen is viewed from oblique directions such as the driver's seat and the front-passenger's seat, for example. Hence, it is not desirable to increase the brightness of the front surface direction and decrease those of the oblique directions. Meanwhile, in accordance with an aspect of the present invention, there is provided a member such as the parallax barrier 115 having functions of passing the light of the direction in which the image is visible and reflecting or absorbing the light in the front surface direction, in the multi-view display in which different images are visible from different viewing directions on a common display screen. It is therefore possible to enhance the brightness of the display screen 102 in an oblique direction, namely, the liquid crystal panel 110, in particular, by employing the front surface brightness increasing film 124.

In the above-described exemplary embodiment, the description has been given of an example of the multi-view display apparatus having the parallax barrier 115. However, the present invention is not limited thereto. The diffuser 122, the front surface brightness increasing film 124, and the polarizing plate 126 are not limited to the above-described configuration, if the same functions are available.

In the above-described exemplary embodiments, the description has been given of the liquid crystal display apparatus mounted in a vehicle as an example. However, the present invention is not limited thereto, and is applicable to any display apparatus other than the in-vehicle liquid crystal display apparatus.

The description heretofore has been given of a case where the driver sits on a right-hand side in an automobile and the front-seat passenger sits on a left-hand side, however, the present invention is not limited thereto. The driver may sit on a left-hand side and the front-seat passenger may sit on a right-hand side in an automobile.

The present invention is not limited to the above-mentioned exemplary embodiments, and other embodiments, variations and modifications may be made without departing from the scope of the present invention.

The present invention is based on Japanese Patent Application No. 2005-274788 filed on Sep. 21, 2005, the entire disclosure of which is hereby incorporated by reference.

What is claimed is:

1. A display apparatus comprising:
 a display panel that simultaneously displays a plurality of individual images that are visible in a corresponding plurality of viewing directions on a common screen;
 a parallax barrier that makes the individual images respectively visible from the plurality of viewing directions;
 a light guide plate that guides a light to the display panel;
 a diffuser arranged between the light guide plate and the display panel;
 a front surface brightness increasing film arranged between the diffuser and the display panel; and
 a polarizing plate separate from the front surface brightness increasing film and arranged between the front surface brightness increasing film and the display panel.

2. The display apparatus as claimed in claim 1, wherein the diffuser includes a transparent plate and transparent spherical particles provided on a surface of the transparent plate.

3. The display apparatus as claimed in claim 1, wherein the front surface brightness increasing film includes a transparent plate having transparent prism slits on a surface thereof.

4. The display apparatus as claimed in claim 1, wherein a polarization direction of the polarizing plate is the polarization direction of the display panel.

5. A display apparatus comprising:
 a display panel that simultaneously displays a plurality of individual images that are visible in a corresponding plurality of viewing directions on a common screen;
 a parallax barrier that makes the individual images respectively visible from the plurality of viewing directions;
 a light guide plate that guides a light to the display panel;
 a diffuser arranged between the light guide plate and the display panel;
 a front surface brightness increasing film arranged between the diffuser and the display panel;
 a polarizing plate separate from the front surface brightness increasing film and arranged between the front surface brightness increasing film and the display panel; and
 a display controller that outputs the individual images on the display panel.

* * * * *